(12) United States Patent
Schulz et al.

(10) Patent No.: US 11,525,052 B2
(45) Date of Patent: Dec. 13, 2022

(54) THERMOPLASTIC STYRENE COPOLYMER RESIN COMPOSITION WITH IMPROVED UV RESISTANCE

(71) Applicant: INEOS STYROLUTION GROUP GMBH, Frankfurt am Main (DE)

(72) Inventors: Tobias Schulz, Cologne (DE); Felix Rattay, Neuss (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 164 days.

(21) Appl. No.: 16/627,448

(22) PCT Filed: Jul. 3, 2018

(86) PCT No.: PCT/EP2018/067955
§ 371 (c)(1),
(2) Date: Dec. 30, 2019

(87) PCT Pub. No.: WO2019/007961
PCT Pub. Date: Jan. 10, 2019

(65) Prior Publication Data
US 2021/0147668 A1    May 20, 2021

(30) Foreign Application Priority Data
Jul. 5, 2017 (EP) .................... 17179755

(51) Int. Cl.
*C08L 25/12* (2006.01)
*C08L 51/00* (2006.01)
*C08F 220/18* (2006.01)
*C08K 3/22* (2006.01)
*C08K 5/3432* (2006.01)

(52) U.S. Cl.
CPC ........ *C08L 25/12* (2013.01); *C08F 220/1804* (2020.02); *C08K 3/22* (2013.01); *C08K 5/3432* (2013.01); *C08L 51/003* (2013.01); *C08K 2003/2265* (2013.01); *C08L 2201/08* (2013.01); *C08L 2203/30* (2013.01); *C08L 2205/18* (2013.01); *C08L 2207/04* (2013.01); *C08L 2310/00* (2013.01)

(58) Field of Classification Search
CPC .... C08L 25/12; C08L 51/003; C08L 2203/30; C08L 2310/00; C08L 2207/04; C08L 2205/18; C08L 2201/08; C08F 220/1804; C08K 3/22; C08K 5/3432; C08K 2003/2265
See application file for complete search history.

(56) References Cited

U.S. PATENT DOCUMENTS

| | | |
|---|---|---|
| 3,419,634 A | 12/1968 | Vaughn |
| 3,553,167 A | 1/1971 | Schnell et al. |
| 4,009,226 A | 2/1977 | Ott |
| 4,075,173 A | 2/1978 | Maruyama et al. |
| 4,156,069 A | 5/1979 | Prevorsek et al. |
| 4,181,788 A | 1/1980 | Wingler et al. |
| 4,224,419 A | 9/1980 | Swoboda et al. |
| 4,269,964 A | 5/1981 | Freitag et al. |
| 4,311,823 A | 1/1982 | Imai et al. |
| 4,334,053 A | 6/1982 | Freitag et al. |
| 4,584,360 A | 4/1986 | Paul et al. |
| 4,692,486 A | 9/1987 | Gugumus |
| 4,877,826 A | 10/1989 | Beyer |
| 4,982,014 A | 1/1991 | Freitag et al. |
| 6,140,426 A | 10/2000 | Sarabi et al. |
| 11,225,570 B2 * | 1/2022 | Schulz ............. C08J 3/22 |
| 2003/0225191 A1 | 12/2003 | Gugumus |
| 2006/0124904 A1 | 6/2006 | Gugumus |
| 2006/0270772 A1 | 11/2006 | Black |
| 2010/0160190 A1 * | 6/2010 | Kuvshinnikova ....... C08L 25/14 508/117 |
| 2012/0007283 A1 | 1/2012 | Minkwitz |
| 2012/0046408 A1 * | 2/2012 | Minkwitz ............. C08K 5/34 524/504 |
| 2013/0253105 A1 | 9/2013 | Shan |

(Continued)

FOREIGN PATENT DOCUMENTS

| | | |
|---|---|---|
| CA | 1173998 A | 9/1984 |
| CN | 104 212 107 A | 12/2014 |

(Continued)

OTHER PUBLICATIONS

N. Niessner, Practical Guide to Structures, Properties and Applications of Styrenic Polymers; United Kingdom: Smithers Rapra Technology Ltd. 2013, Chapter 4.

(Continued)

*Primary Examiner* — Robert D Harlan
(74) *Attorney, Agent, or Firm* — Raphael Bellum PLLC (57) ABSTRACT

Thermoplastic styrene copolymer resin composition comprising: (a1) at least one styrene-acrylonitrile copolymer component A1, (a2) at least one acrylonitrile styrene acrylate graft copolymer A2 as impact modifier, (a3) optionally at least one thermoplastic polymer A3 other than components A1 and A2, (b) at least one transition metal oxide pigment B, (c1) at least one hindered amine UV light stabilizer C1, (c2) optionally at least one UV absorber C2 different from C1, (d) optionally further polymer additives D, other than components B, C1, C2, and E, and (e) optionally one metal scavenger component E, wherein at least 99.0 wt.-% of the transition metal oxide pigment B consist of transition metal atoms and oxygen atoms.

14 Claims, 4 Drawing Sheets

(56) References Cited

U.S. PATENT DOCUMENTS

| | | |
|---|---|---|
| 2014/0287250 A1 | 9/2014 | Schaller et al. |
| 2015/0087765 A1* | 3/2015 | Sperling ............... C08L 35/06 524/504 |
| 2016/0060446 A1 | 3/2016 | Park et al. |
| 2019/0248985 A1 | 8/2019 | Minkwitz |

FOREIGN PATENT DOCUMENTS

| | | |
|---|---|---|
| DE | 1 495 626 | 6/1971 |
| DE | 2 232 877 A1 | 1/1974 |
| DE | 24 20 358 A | 12/1975 |
| DE | 2 703 376 A1 | 8/1977 |
| DE | 2 714 544 A1 | 10/1977 |
| DE | 27 24 360 A | 12/1978 |
| DE | 28 26 925 A1 | 1/1980 |
| DE | 2 842 005 A1 | 4/1980 |
| DE | 3 000 610 A1 | 7/1980 |
| DE | 2 940 024 A1 | 4/1981 |
| DE | 3 007 934 A1 | 9/1981 |
| DE | 3 334 782 A1 | 10/1984 |
| DE | 3 832 396 A1 | 2/1990 |
| DE | 1 971 3509 A1 | 10/1998 |
| DE | 10316198 A1 | 10/2003 |
| EP | 2593507 B1 | 1/2017 |
| WO | 2012/007268 A1 | 1/2012 |

OTHER PUBLICATIONS

Scholtan et al., "Bestimmung der Teilchengrobenverteilung von Latices mit der Ultrazentrifuge," Kolloid-Z. u. Z. Polymere 250, 1972, pp. 782-796; see specification for relevancy at p. 8, lines 34-36.

W. Wohlleben et al., "Measurement of Particle Size Distribution of Polymer Latexes", 2010, Editors: L. Gugliotta, J. Vegam p. 130-153.

Lange, "Bestimmung von Teilchengroben aus Trubung und Brechungsinkrement," Kolloid-Z. u. Z. Polymere, Band 223, Heft 1, 1967, pp. 24-30; see specification for relevancy at p. 9, lines 4-6.

International Search Report and Written Opinion of International Application No. PCT/EP2018/067955, dated Oct. 16, 2018.

* cited by examiner

Fig. 1

Colotherm Red 110M

Fig. 2

Sicotrans Red K2915

THERMOPLASTIC STYRENE COPOLYMER RESIN COMPOSITION WITH IMPROVED UV RESISTANCE

The invention relates to a thermoplastic styrene copolymer resin composition with improved UV resistance comprising at least one styrene-acrylonitrile copolymer, at least one acrylonitrile styrene acrylate graft copolymer, at least one transition metal oxide pigment, and at least one hindered amine UV light stabilizer. The invention further relates to a method for the preparation of said thermoplastic resin composition, the use of said thermoplastic resin composition, and molded articles prepared from said thermoplastic resin composition.

Acrylonitrile-styrene-acrylates (ASA) are thermoplastic resin materials with intrinsic UV resistance due to the lack of reactive carbon-carbon double bonds. However, in order to use such thermoplastic resin compositions in outdoor applications under sometimes harsh conditions such as rain and intensive UV exposure by sunlight, UV stabilizers are necessary. Missing UV stabilization leads to inferior mechanical properties such as reduced impact toughness, reduced stress-strain characteristics, reduced resistance to chemicals, discolorations such as yellowing of the thermoplastic resin composition, loss of transparency of transparent thermoplastic resin compositions, surface damage resulting in parts of the surface being washed off giving rise to irregular scattering of re-flected light, which is perceived as lightening or graying of the thermoplastic resin composition.

In addition, thermoplastic resin compositions often comprise at least one pigment. The pigments themselves already have a significant influence on the UV stability of the thermoplastic resin composition. Especially in the case of transition metal oxide containing pigments such as iron oxide pigments, lower UV resistance can be observed. As a result for example, after artificial weathering a larger color shift dE of the thermoplastic resin compositions comprising transition metal oxide pigments can be observed compared to thermoplastic resin compositions comprising pigments not based on transition metal oxides. Several routes to produce transition metal oxides are known. For example, iron oxide pigments may be prepared by thermal decomposition of iron compounds such roasting and calcining of iron sulfate and $\alpha$-FeOOH or by oxidation of $Fe_3O_4$. Another process known is a precipitation process comprising the oxidation of iron sulfate in basic aqueous solution. The long known reaction of nitrobenzene with metallic iron has been so adapted that high tinting strength $Fe_3O_4$ pigment is formed, the process being called the Laux process. Pigment is formed in the absence of bases and nitrobenzene is used as an oxidation agent. From subsequent oxidation red $Fe_2O_3$ is obtained from $Fe_3O_4$, produced by the Laux process A systematic list of mixed metal oxide inorganic colored pigments is given in the publi-cation "DCMA: Classification and Chemical Description of the Mixed Metal Oxide Inorganic Colored Pigments", Second Edition, January 1982.

UV absorbers from the class of hydroxyphenyl-benzotriazoles are well known as UV stabilizers for polymers in general. Another class of UV stabilizers is the group of hindered amine lights stabilizers (HALS) used for stabilization of all sorts of polymers. UV stabilizers are commonly used as mixtures of several classes of UV stabilizers for best UV stabilization. UV stabilizer mixtures are also selected for synergistic effects obtained by combination of UV stabilizers of different classes. In polymer compositions scavengers of various types are also generally known to be used capturing oxygen.

A general overview on the different aspects of ASA thermoplastic resins is provided in N. Niessner, Practical Guide to Structures, Properties and Applications of Styrenic Polymers; United Kingdom: Smithers Rapra Technology Ltd, 2013, Chapter 4. Thermoplastic styrene copolymer resin compositions with improved resistance to weathering are well known in the art.

US 2016/060446 discloses thermoplastic resin compositions which can realize good coloring properties and weathering resistance while providing a high quality appear-ance. This is achieved by inter alia applying both a UV stabilizer and a UV absorber. U.S. Pat. No. 4,877,826 describes weatherable styrenic polymer blends comprising polyalkylene glycol. However, the polymer blends show low initial gloss and only limited weatherabil-ity. In U.S. Pat. No. 4,692,486 a synergistic mixture of low-molecular and high-molecular poly-alkylpiperidines, i.e. mixtures of different HALS as UV stabilizers in polypropylene, pol-yurethane and polystyrene is proposed.

DE-A 10316198 teaches ternary stabilizer mixtures of different UV stabilizers for use in various thermoplastic resin compositions. EP-A 2593507 discloses weathering-resistant styrene copolymer moulding compositions. Different high gloss ASA resin compositions are described each comprising two different HALS and additionally styrene acrylonitrile oligomer. WO 2012/007268 relates to stabilized acrylonitrile-styrene-acrylic ester molding compositions comprising different UV stabilizers. US 20060270772 discloses elemental or reduced metal scavengers used as triggerable active oxygen barriers in polyester compositions.

There is however a continuous need for thermoplastic resin compositions with improved UV resistance. It was one objective of the present invention to provide thermoplastic resin compositions which comply with the above identified technical needs.

This task was achieved by the present invention as described herein below and as re-flected in the claims.

The term "copolymer" as used herein describes a polymer which is formed by polymer-izing two or more different monomers. The polymer may be composed of only one linear chain or may be branched. The monomer units in the copolymer may be alternating regularly forming an alternating copolymer, may repeat periodically forming a periodic copolymer, may be statistically distributed forming a statistical copolymer, or may form different blocks, forming a block copolymer.

The present invention is described by disclosing various aspects of the invention and combinations of different aspects pertaining to different features are also envisaged. All ratios presented in wt.-% are based on the total weight of the thermoplastic resin composition unless otherwise indicated.

The invention relates to a thermoplastic styrene copolymer resin composition comprising (or consisting of):
- (a1) at least one styrene-acrylonitrile copolymer component A1,
- (a2) at least one acrylonitrile styrene acrylate graft copolymer A2 as impact modifier,
- (a3) optionally at least one thermoplastic polymer A3, other than components A1 and A2,
- (b) at least one transition metal oxide pigment B,
- (c1) at least one hindered amine UV light stabilizer C1,
- (c2) optionally at least one UV absorber C2 different from C1,
- (d) optionally further polymer additives D, other than components B, C1, C2, and E, and
- (e) optionally at least one metal scavenger component E, wherein at least 99.0 wt.-% of the transition metal oxide pigment B consist of transition metal atoms and oxygen atoms.

In one aspect of the present invention, the thermoplastic resin composition comprises (or consist of) from 70.0 to 99.4 wt.-% of components A1, A2, and optionally A3, and from 0.5 to 7.0 wt.-% of component B, and from 0.1 to 3.0 wt.-% of component C1 and optionally C2.

In another aspect of the present invention, the thermoplastic resin composition comprises of from 86.0 to 99.3 wt.-% of A1, A2, and optionally A3, and from 0.4 to 7.0 wt.-% of component B, of from 0.1 to 1.5 wt.-% of at least one hindered amine UV light stabilizer C1 and optionally of from 0.1 to 1.5 wt.-% of at least one UV absorber C2 other than C1, of from 0.1 to 2.5 wt.-% of at least one further polymer additive D, and of from 0.1 to 1.5 wt.-% of at least one metal scavenger component E. In a further aspect, component B is present in the range of from 0.7 to 5.0 wt.-%. In another aspect, component B is present in the range of from 0.8 to 4.0 wt.-%. In another aspect, component B is present in the range of from 1.0 to 2.0 wt.-%.

In a further aspect component C1 is present in the range of from 0.2 to 1.25 wt.-%. In another aspect component C2 is present in the range of from 0.2 to 1.25 wt.-%. In another aspect component C1 is present in the range of from 0.3 to 1.0 wt.-%. In a further aspect component C2 is present in the range of from 0.3 to 1.0 wt.-%. In another aspect, component C1 is present in the range of from 0.4 to 0.8 wt.-%. In another aspect, component C2 is present in the range of from 0.4 to 0.8 wt.-%. In a further aspect of the present invention C1 and C2 are both present in the range of from 0.2 to 1.25 wt.-%. In an even further aspect of the present invention C1 and C2 are both present in the range of from 0.3 to 1.0 wt.-%. In an even further aspect of the present invention C1 and C2 are both present in the range of from 0.4 to 0.8 wt.-%. In another aspect Component D is present in the range of from 0.2 to 2.0 wt.-%. In a further aspect, component D is present in the range of from 0.3 to 1.75 wt.-%. In another aspect, component B is present in the range of from 0.7 to 5.0 wt.-%, component C1 is present in the range of from 0.2 to 1.25 wt.-%, and component C2 is present in the range of from 0.2 to 1.25 wt.-%.

In one aspects of the present invention, only hindered amine UV light stabilizers C1 and no UV absorbers C2 are present in the thermoplastic resin composition. This is to be understood that less than 10 wt.-% of UV stabilizers or absorbers based on the total weight of UV stabilizers C other than UV stabilizers of the HALS class are present in the thermoplastic resin composition of the present invention. In another aspect of the present invention, only 2 wt.-% of UV stabilizers or absorbers based on the total weight of UV stabilizers C other than UV stabilizers of the HALS class are present in the thermoplastic resin composition of the present invention. In a further aspect less than 0.1 wt.-% of UV stabilizers or absorbers based on the total weight of UV stabilizers C other than UV stabilizers of the HALS class are present in the thermoplastic resin composition of the present invention.

The styrene-acrylonitrile copolymer A1 and the acrylonitrile styrene acrylate graft copolymer A2 form together the acrylonitrile styrene acrylate terpolymer (ASA). This terpolymer is either used on its own or as blend with for example polyamide (ASA/PA) or with polycarbonate (ASA/PC). The spherical particles of crosslinked acrylate rubber are chemically grafted with styrene acrylonitrile copolymer chains (A2), and are embedded in a styrene acrylonitrile matrix (A1).

The ratio of styrene-acrylonitrile copolymer A1 to acrylonitrile styrene acrylate graft copolymer A2 is in the range of from 10 wt.-% to 95 wt.-% based of A1 to 90 wt.-% to 5 wt.-% of A2 based on the weight of A1 and A2. In one aspect of the invention, the ra-tion of A1 to A2 is in the range of from 45 wt.-% to 90 wt.-% A1 to 55 wt.-% to 10 wt.-% of A2 based on the weight of A1 and A2.

In an aspect of the present invention the copolymer A1 is a rubber free styrene-acrylonitrile copolymer.

In another aspect of the present invention, the styrene-acrylonitrile copolymer A1 is prepared from at least one first monomer selected from the group consisting of styrene, alpha-methylstyrene, and mixtures thereof, and from a second monomer which is acrylonitrile. In a further aspect the styrene-acrylonitrile copolymer A1 comprises at least 10 wt.-% based on the total weight of component A1 of styrene. In another aspect copol-ymer A1 comprises at least 50 wt.-% based on the total weight of component A1 of styrene. In even another aspect copolymer A1 comprises at least 65 wt.-% based on the total weight of component A1 of styrene.

In one aspect of the present invention, the styrene-acrylonitrile copolymer component A1 has an acrylonitrile content of from 5 to 35 wt.-% based on the total weight of the styrene-acrylonitrile copolymer component A1. In another aspect the styrene-acrylo-nitrile copolymer component A1 has an acrylonitrile content of from 15 to 35 wt.-% based on the total weight of the styrene-acrylonitrile copolymer component A1.

In a further aspect the styrene-acrylonitrile copolymer component A1 has an acryloni-trile content of from 22 to 35 wt.-% based on the total weight of the styrene-acrylonitrile copolymer component A1.

In a further aspect of the present invention the styrene-acrylonitrile copolymer A1 is prepared from 50 to 96 wt.-% based on the total weight of copolymer A1 of styrene and/or alpha-methylstyrene and 4 to 50 wt.-% based on the total weight of copolymer A1 of acrylonitrile.

In another aspect the styrene-acrylonitrile copolymer A1 is prepared from 60 to 85 wt.-% based on the total weight of copolymer A1 of styrene and/or alpha-methylstyrene and 15 to 40 wt.-% based on the total weight of copolymer A1 of acrylonitrile. In anoth-er aspect the styrene-acrylonitrile copolymer A1 is prepared from 65 wt.-% based on the total weight of copolymer A1 of styrene and 35 wt.-% based on the total weight of copolymer A1 of acrylonitrile.

In one embodiment of the present invention the weight average molecular weight $M_w$ of the styrene-acrylonitrile copolymer A1 ranges of from 20,000 to 200,000 g/mol. In another aspect the intrinsic viscosity [h] of the styrene-acrylonitrile copolymer A1 is of from 20 to 110 ml/g, determined in dimethylformamide (DMF) at 25° C. In another aspect the viscosity number VN of the styrene-acrylonitrile copolymer A1 is of from 50 to 100 cm$^3$/g determined according to DIN 53726. In even another aspect, the viscosity number is in the range of from 55 to 85 cm$^3$/g.

The synthesis of styrene-acrylonitrile copolymers A1 is for example described in DE-A 24 20 358 and DE-A 27 24 360. Styrene-acrylonitrile copolymers are also described in DE-A 1 971 3509.

The copolymer A1 can be prepared according to the methods known in the art such as by radical polymerization, for example by emulsion polymerization, suspension polymerization, polymerization in solution or polymerization in mass.

The acrylonitrile styrene acrylate graft copolymer A2 comprises spherical particles of crosslinked acrylate rubber A2.1 that are chemically grafted with styrene acrylonitrile copolymer chains A2.2.

In one aspect of the invention, the acrylonitrile styrene acrylate graft copolymer A2 comprises of from 50 to 90 wt.-% based in the total weight of A2 of spherical particles of crosslinked acrylate rubber graft base A2.1 and of from 10 to 50 wt.-% based on the total weight of A2 of graft of styrene acrylonitrile copolymer chains A2.2

The acrylate rubber graft base A2.1 may comprise:
(i) of from 70 to 99.9 wt.-% based on the total weight of A2.1 of at least one $C_1$- to $C_8$-alkyl(meth)acrylate,
(ii) of from 0 to 29.5 wt.-% based on the total weight of A2.1 of at least one further monomer selected from the group consisting of styrene, alpha-methylstyrene, $C_1$- to $C_4$-alkylstyrene, acrylonitrile, methacrylonitrile, isoprene, butadiene, chloroprene, methylmethacrylate, alkylenglycole-di(meth)acrylate, and vinylmethylether; and
(iii) of from 0.1 to 10 wt.-% based on the total weight of A2.1 of at least one di- or polyfunctional crosslinking agent.

The graft of styrene acrylonitrile copolymer chains A2.2 may comprise:
(iv) of from 50 to 100 wt.-% based on the total weight of the graft A2.2 of at least one monomer selected from the group consisting of styrene, alpha-methylstyrene, p-methylstyrene, $C_1$- to $C_4$-alkyl(meth)acrylate, and
(v) of from 0 to 50 wt.-% based on the total weight of the graft A2.2 of at least one monomer selected from the group consisting of acrylonitrile, methac-rylnitril, acrylamide, vinylmethyl ether, anhydrides of unsaturated carbox-ylic acids such as maleic acid anhydride, phthalic acid anhydride, and imides of unsaturated carboxylic acids such as N-cyclohexylmaleimide and N-phenylmaleimide.

In one aspect of the present invention, component A2 comprises a graft base A2.1 of from 40 to 90 wt.-% based on the total weight of the impact-modified graft rubber acrylonitrile styrene acrylate A2 comprising
(i) from 70 to 99.9 wt.-% of n-butyl acrylate based on the total weight of A2.1,
(ii) from 0 to 30 wt.-% of styrene based on the total weight of A2.1,
(iii) from 0.1 to 5 wt.-% of a crosslinking agent based on the total weight of A2.1; and a graft A2.2 of from 10 to 60 wt.-% comprising
(iv) from 65 to 95 wt.-% based on the total weight of A2.2 of styrene, and
(v) from 5 to 35 wt.-% based on the total weight of A2.2 of acrylonitrile.

The term crosslinking agent is to be understood to describe a compound with at least two double bonds, for example chemically different double bonds, such as one acrylic double bond. In one aspect of the present invention the crosslinking agent is selected from the group consisting of allyl(meth)acrylate, divinylbenzene, diallylmaleate, diallylfumarate, diallylpthalate, triallylcyanurat, triallylisocyanurat, and dicyclopentadienyl acrylate. In another aspect of the present invention the crosslinking agent is allyl methacrylate (AMA) and/or dicyclopentadienyl acrylate (DCPA).

In another aspect of the present invention the graft base A2.1 comprises of from 90 to 99.9 wt.-%, based on the total weight of the graft base A2.1, of n-butyl acrylate. In a further aspect, the graft base A2.1 comprises of from 1 to 10 wt.-%, based on the total weight of the graft base A2.1, of styrene.

In another aspect the graft base A2.1 comprises of from 0.1 to 2.5 wt.-% of a crosslinking agent based on the total weight of A2.1. In a further aspect the graft base A2.1 comprises of from 0.4 to 2.1 wt.-% of a crosslinking agent based on the total weight of A2.1

In another aspect of the present invention, the average particle size $d_{50}$ of the acrylonitrile styrene acrylate graft copolymer A2, determined using an ultracentrifuge, is generally of from 50 to 1000 nm. In a further aspect the average particle size $d_{50}$ of the acrylonitrile styrene acrylate graft copolymer A2 is of from 60 to 850 nm. In another aspect the average particle size $d_{50}$ of the acrylonitrile styrene acrylate graft copolymer A2 is of from 90 to 700 nm. In even another aspect of the average particle size $d_{50}$ of the acrylonitrile styrene acrylate graft copolymer A2 is particularly of from 70 to 700 nm. In a further aspect of the present invention, the acrylonitrile styrene acrylate graft copolymer A2 comprises different particles with different mean particle diameters, one acrylonitrile styrene acrylate graft copolymer A2 having a mean particle diameter $d_{50}$ of from 50 to 180 nm, and a second acrylonitrile styrene acrylate graft copolymer A2 having a mean particle diameter $d_{50}$ of from 200 to 800 nm.

In another aspect the acrylonitrile styrene acrylate graft copolymer A2 comprises one acrylonitrile styrene acrylate graft copolymer A2 having a mean particle diameter $d_{50}$ of from 80 to 150 nm, and a second acrylonitrile styrene acrylate graft copolymer A2 having a mean particle diameter $d_{50}$ of from 300 to 700 nm. In one aspect of the present invention, the different acrylonitrile styrene acrylate graft copolymers A2 are prepared by individually grafting different graft bases A2.1 with the different grafts A2.2. In even another aspect the acrylonitrile styrene acrylate graft copolymer A2 comprises one acrylonitrile styrene acrylate graft copolymer A2 having a mean particle diameter $d_{50}$ of from 90 to 100 nm, and a second acrylonitrile styrene acrylate graft copolymer A2 having a mean particle diameter $d_{50}$ of from 400 to 600 nm. In a further aspect one acrylo-nitrile styrene acrylate graft copolymer A2 is desired to have a narrow particle size distribution Q calculated from $(d_{90}-d_{10})/d_{50}$ being less than 0.3. In another aspect Q is less than 0.2.

The particle size of latex particles can be controlled during synthesis by suitable means as disclosed for example in DE-A 28 26 925. Typically mean particle size can be measured by ultracentrifugation as described in W. Scholtan et al., Kolloid-Z. u. Z. Polymere 250, pages 782 to 796, 1972 or using Hydrodynamic Chromatigraphy (HDC) as disclosed in W. Wohlleben et al., "Measurement of Particle Size Distribution of Polymer Latexes", 2010, Editors: L. Gugliotta, J. Vegam p. 130-153.

The mean particle diameter $d_{50}$ represents the diameter value of the particle size distribution curve where 50 vol.-% have a larger diameter compared to the $d_{50}$ value. In similar way for example the $d_{90}$ value gives the particle diameter where 90 vol.-% of all particles have a smaller diameter. The mean particle size (mass mean; $d_w$) can also be determined by turbidity measurement as described in Lange, Kolloid-Z. u. Z. Polymere, Band 223, Heft 1.

In a further aspect of the present invention, the thermoplastic resin composition comprises of from 1 to 70 wt.-% based on the total weight of components A1 and A2 of at least one thermoplastic polymer A3 selected from polycarbonate (PC), polyamide (PA), and mixtures thereof. In another aspect, the thermoplastic resin composition comprises of from 0 to 50 wt.-% based on the total weight of the ASA components A1 and A2 of at least one thermoplastic polymer A3 selected from polycarbonate (PC), polyamide (PA) and mixtures thereof.

In a further aspect of the invention, the thermoplastic resin composition comprises from 10 to 50 wt.-% based on the total weight of components A1 and A2 of at least one thermoplastic polymer A3 selected from polycarbonate (PC), polyamide (PA), and mixtures thereof. In even another aspect of the invention, the thermoplastic resin composition comprises of from 20 to 40 wt.-% based on the total weight of components A1 and A2 of at least one thermoplastic polymer A3 selected from polycarbonate (PC), polyamide (PA), and mixtures thereof.

In another aspect of the present invention, the thermoplastic polymer A3 is selected from the group consisting of polycarbonate (PC), polyamide (PA), and mixtures thereof.

Polycarbonate includes one or more, in another aspect one or two, in a further aspect one aromatic polycarbonate. Aromatic polycarbonate includes for example polycondensation products, for example aromatic polycarbonates, aromatic polyester carbonates.

According to the invention suitable aromatic polycarbonates and/or aromatic polyester carbonates are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934).

The preparation of aromatic polycarbonates is carried out e.g. by reaction of diphenols with carbonic acid halides, in another aspect phosgene, and/or with aromatic dicarboxylic acid dihalides, in another aspect benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

In one aspect diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)sulfoxides, bis-(hydroxyphenyl)ketones, bis-(hydroxyphenyl)sulfones and $\alpha,\alpha$-bis-(hydroxyphenyl)-diisopropyl-benzenes and nucleus-brominated and/or nucleus-chlorinated derivatives thereof. In a further aspect diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-ch loro-4-hydroxyphenyl)-propane, 2,2-bis-(3,5-d ichloro-4-hyd roxyphenyl)-propane or 2,2-bis-(3,5-dibromo-4-hydroxyphenyl)-propane. In another aspect 2,2-bis-(4-hydroxyphenyl)-propane (bisphenol A) is used. The diphenols may be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphe-nols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between of from 0.5 mol-% and 10 mol-%, based on the sum of the moles of the particular diphenols employed.

The thermoplastic, aromatic polycarbonates have weight-average molecular weights ($M_w$, measured e.g. by ultracentrifuge or scattered light measurement) of from 10.000 to 200.000 g/mol, in another aspect 15.000 to 80.000 g/mol, in a further aspect 24.000 to 32.000 g/mol. The thermoplastic, aromatic polycarbonates may be branched in a known manner, and in another aspect by incorporation of from 0.05 to 2.0 mol-%, based on the sum of the diphenols employed, of compounds which are trifunctional or more than trifunctional, for example those having three and more phenolic groups. Both homopolycarbonates and copolycarbonates are suitable. It is also possible of from 1 to 25 wt.-%, in another aspect 2.5 to 25 wt.-%, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by processes known from the literature. The preparation of copolycarbonates containing polydiorganosiloxanes is described in DE-A 3 334 782. In another aspect polycarbonates are, in addition to the bisphenol A homopolycarbonates, the copolycarbonates of bi-spheno) A with up to 15 mol-%, based on the sum of the moles of diphenols, of other diphenols mentioned, in a further aspect 2,2-bis-(3,5-dibromo-4-hydroxyphenyl)-propane.

Aromatic dicarboxylic acid dihalides for the preparation of aromatic polyester carbonates are in another aspect the diacid dichlorides of isophthalic acid, terephthalic acid, di-phenyl ether-4,4'-dicarboxylic acid and of naphthalene-2,6-dicarboxylic acid. Mixtures of the diacid dichlorides of isophthalic acid and of terephthalic acid are in a ratio of from between 1:20 and 20:1. A carbonic acid halide, in another aspect phosgene, is additionally co-used as a bifunctional acid derivative in the preparation of polyester carbonates. Possible chain terminators for the preparation of the aromatic polyester carbonates are, in addition to the monophenols already mentioned, also chlorocar-bonic acid esters thereof as well as the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides. The amount of chain terminators is in each case of from 0.1 to 10 mol-%, based on the moles of diphenol in the case of the phenolic chain terminators and on the moles of dicarboxylic acid dichloride in the case of monocarboxylic acid chloride chain terminators. The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934). Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol-% (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methyl-phenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxy-triphenyl)-methyl]-benzene, in amounts of from 0.01 to 1.0 mol-%, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. In one aspect, the content of carbonate groups is up to 100 mol-%, in another aspect up to 80 mol-%, in a further aspect up to 50 mol-%, based on the sum of ester groups and carbonate groups. Both the ester and the carbonate content of the aromatic polyester carbonates may be present in the polycon-densate in the form of blocks or in random distribution.

The relative solution viscosity ($\eta_{rel}$) of the aromatic polycarbonates and polyester carbonates is in the range of from 1.18 to 1.4, in another aspect 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves, or in any desired mixture of one or more, or in another aspect one to three, or one or two thereof. In a further aspect only one type of polycarbonate is used.

In even another aspect the aromatic polycarbonate is a polycarbonate based on bisphenol A and phosgene, which includes polycarbonates that have been prepared from corresponding precursors or synthetic building blocks of bisphenol A and phosgene. These aromatic polycarbonates may be linear or branched due to the presence of branching sites.

Suitable polyamides are known homopolyamides, copolyamides and mixtures of such polyamides. They may be semi-crystalline and/or amorphous polyamides.

Suitable semi-crystalline polyamides are polyamide-6, polyamide-6,6, mixtures and corresponding copolymers of those components. Also included are semi-crystalline polyamides the acid component of which consists wholly or partially of terephthalic acid and/or isophthalic acid and/or suberic acid and/or sebacic acid and/or azelaic acid and/or adipic acid and/or cyclohexanedicarboxylic acid, the diamine component of which consists wholly or partially of m- and/or p-xylene-diamine and/or hexamethylenediamine and/or 2,2,4-trimethylhexamethylenediamine and/or 2,2,4-trimethylhexamethylenediamine and/or isophoronediamine, and the composition of which is in principle known. Mention may also be made of polyamides that are prepared wholly or partially from lactams having from 7 to 12 carbon atoms in the ring, optionally with the concomitant use of one or more of the above-mentioned starting components.

In another aspect semi-crystalline polyamides are polyamide-6 and polyamide-6,6 and mixtures thereof. Known products may be used as amorphous polyamides. They are obtained by polycondensation of diamines, such as ethylenediamine, hexamethylenediamine, decamethylenediamine, 2,2,4- and/or 2,4,4-trimethylhexamethylenediamine, m- and/or p-xylylene diamine, bis-(4-aminocyclohexyl)-methane, bis-(4-aminocyclo-hexyl)-propane, 3,3'-dimethyl-4,4'-diamino-dicyclohexylmethane, 3-aminomethyl-3,5,5-trimethylcyclohexylamine, 2,5- and/or 2,6-bis-(aminomethyl)-norbornane and/or 1,4-diaminomethylcyclohexane, with dicarboxylic acids such as oxalic acid, adipic acid, azelaic acid, azelaic acid, decanedicarboxylic acid, heptadecanedicarboxylic acid, 2,2,4- and/or 2,4,4-trimethyladipic acid, isophthalic acid and terephthalic acid. Also suitable are copolymers obtained by poly-condensation of a plurality of monomers, as well as copolymers prepared with the addi-tion of aminocarboxylic acids such as ε-ami-nocaproic acid, w-aminoundecanoic acid or w-aminolauric acid or their lactams.

In a further aspect suitable amorphous polyamides are the polyamides prepared from isophthalic acid, hexamethylenediamine and further di-amines such as 4,4'-diamino-dicyclohexylmethane, isophoronediamine, 2,2,4- and/or 2,4,4-trimethylhexamethylenediamine, 2,5- and/or 2,6-bis-(aminomethyl)-norbornene; or from isophthalic acid, 4,4'-diamino-dicyclohexylmethane and ε-caprolactam; or from isophthalic acid, 3,3'-di-methyl-4,4'-diamino-dicyclohexylmethane and laurinlactam; or from terephthalic acid and the isomeric mixture of 2,2,4- and/or 2,4,4-trimethylhexamethylenediamine. In-stead of pure 4,4'-diaminodicyclohexylmethane it is also possible to use mixtures of the position-isomeric diaminodicyclohexylmethanes, which are composed of from 70 to 99 mol-% of the 4,4'-diamino isomer, of from 1 to 30 mol-% of the 2,4'-diamino isomer, of from 0 to 2 mol-% of the 2,2'-diamino isomer and optionally corresponding to more highly condensed diamines, which are obtained by hydrogenation of industrial grade diaminodiphenylmethane. Up to 30% of the isophthalic acid may be replaced by terephthalic acid.

In one aspect, the polyamides have a relative viscosity (measured on a 1 wt.-% solution in m-cresol or 1% (weight/volume) solution in 96 wt.-% sulfuric acid at 25° C.) of from 2.0 to 5.0, in a further aspect of from 2.5 to 4.0.

The transition metal oxide pigment B is used for coloring the thermoplastic resin composition. The transition metal oxide pigment B is characterized by that at least 99.0 wt.-% of the transition metal oxide pigment B consists of transition metal atoms and oxygen atoms. In one aspect of the invention the transition metal oxide pigment B is characterized by that at least 99.5 wt.-% of the transition metal oxide pigment B consist of transition metal atoms and oxygen atoms. In another aspect the transition metal oxide pigment B is characterized by that at least 99.8 wt.-% of the transition metal oxide pigment B consist of transition metal atoms and oxygen atoms. In a further aspect the transition metal oxide pigment B is characterized by that at least 99.9 wt.-% of the transition metal oxide pigment B consist of transition metal atoms and oxygen atoms.

In one aspect of the invention the transition metal oxide pigment B is selected from the group consisting of titanium dioxide, chromium oxide, nickel oxide, copper oxide, cobalt oxide, and iron oxide. In another aspect of the invention the transition metal oxide pigment B is selected from the group consisting of iron oxide.

In one aspect of the present invention the transition metal oxide pigment B is iron oxide wherein at least 99.0 wt.-% of the iron oxide pigment B consist of iron atoms and oxygen atoms. In another aspect the transition metal oxide pigment B is iron oxide wherein at least 99.5 wt.-% of the iron oxide pigment B consist of iron atoms and oxygen atoms. In a further aspect the transition metal oxide pigment B is iron oxide wherein at least 99.8 wt.-% of the iron oxide pigment B consist of iron atoms and oxygen atoms. In an even further aspect the transition metal oxide pigment B is iron oxide wherein at least 99.9 wt.-% of the iron oxide pigment B consist of iron atoms and oxygen atoms.

In one aspect of the present invention the transition metal oxide pigment B is iron oxide wherein at least 37.0 wt.-% of iron atoms are present based on the total weight of the iron oxide pigment. In another aspect the transition metal oxide pigment B is iron oxide wherein at least 37.5 wt.-% of iron atoms are present based on the total weight of the iron oxide pigment. In a further aspect the transition metal oxide pigment B is iron oxide wherein at least 38.5 wt.-% of iron atoms are present based on the total weight of the iron oxide pigment. In an even further aspect the transition metal oxide pigment B is iron oxide wherein at least 40.0 wt.-% of iron atoms are present based on the total weight of the iron oxide pigment.

The at least one UV light stabilizer C1 is selected from hindered amine UV light stabilizers (HALS). In one aspect of the present invention, the thermoplastic resin composition according to any of the previous claims, wherein component C1 is a hindered amine UV light stabilizer according to the following formula (Ia) and/or formula (Ib):

(Ia)

(Ib)

wherein R1 is H or methyl; each R2 is individually selected from the group consisting of hydrogen, methyl, and ethyl; R3 is selected from the group consisting of linear $C_1$- to $C_{18}$-esters which are connected to formula (Ia) via the oxygen atom of the ester function; and with R4 being selected from the group consisting of C1 to C10 alkylene.

In another aspect of the present invention, the HALS component C1 is selected from the group consisting of a compound according to formula (II), a compound according to formula (III), and mixtures thereof.

(II)

(III)

This sterically hindered amine according to formula (II) (CAS Number 52829-07-9) and its preparation are known to the skilled person and described in the literature (see U.S. Pat. No. 4,396,769). It is sold by BASF SE under the Tinuvin® 770 name.

The sterically hindered amine according to fomula (III) (CAS Number 167078-06-0) and its preparation from 2,2,6,6-tetra-methyl-4-piperinol and stearic and/or palmitic acid are known to the skilled person and described in the literature (Carlsson et al., Can. Jour-nal of Polymer Science, Polymer Chemistry Edition (1982), 20(2), 575-82). It is sold by Cytec Industries under the Cyasorb® 3853 name.

Another example for hindered amine UV light stabilizers are compounds formula (IV):

(IV)

This sterically hindered amine (CAS Number 71878-19-8) and its preparation are known to the skilled worker and described in the literature (see, for example, EP-A 093 693 and the literature references cited therein). It is sold by BASF SE under the Chimassorb® 944 name.

A further example for a hindered amine UV light stabilizer is the compound of the formula (V):

(V)

where X = wobei

In this formula, n is of from 2 to 25. In another aspect of the invention n is of from 2 to 20. In a further aspect n is of from 2 to 15.

This sterically hindered amine (CAS Number 101357-37-3) and its preparation are known to the skilled worker and described in the literature (see U.S. Pat. No. 5,208,132 and the literature references cited therein). It is sold by ADEKA under the Adeka Stab® LA-68 name.

A further example for a hindered amine UV light stabilizer is the compound of the formula (VI):

(VI)

In this formula, n is of from 2 to 25. In another aspect of the invention n is of from 2 to 20. In a further aspect n is of from 2 to 15.

This sterically hindered amine (CAS Number 82451-48-7) and its preparation are known to the skilled worker and described in the literature (see, for example, U.S. Pat. No. 4,331,586 and the literature references cited therein). It is sold by Cytec Industries under the Cyasorb® UV-3346 name.

A further example for a hindered amine UV light stabilizer is the compound of the formula (VII):

In one aspect of the present invention the at least one component C2 is selected from the group consisting of benzophenone, benzotriazole, and cyanoacrylate. In another aspect the at least one component C2 is selected from the group consisting of benzotriazole and cyanoacrylate. In a further aspect 2-(2-Hydroxy-5-methylhenyl)benzotriazole is used as light stabilizer C2. In another aspect pentaerythri-tol tetrakis(2-cyano-3,3-diphenylacrylate) is used as light stabilizer C2. In an even further aspect 2-(2-Hydroxy-5-methylhenyl)benzotriazole is used in combination with the sterically hindered amines C1 according to formula (II) and formula (III). In a further aspect 2-(2-Hydroxy-5-methylhenyl)benzotriazole is used in combination with the sterically hindered amine C1 according to formula (II).

If present, the at least one polymer additive D is selected from the group consisting of colorants other than transition metal oxides, oxidation retarders, agents to counter thermal decomposition, lubricants and mold release agents, fibrous and pulverulent fillers, reinforcing agents, nucleating agents, and plasticizers. Polymer additives D are different from any component B, C1, C2, and E.

Examples for suitable colorants include all dyes that may be used for transparent, semi-transparent, or non-transparent coloring of styrene copolymers. Any pigment other than transition metal oxides suitable for this purpose can be used. Pigments are either organic or inorganic pigments. Examples for suitable pigments include phthalocy-anines, ultramarine blue, carbon black, and the entire class of organic pigments. Carbon black may be used as colorant, for example in a mixture of 60 wt.-% of carbon black together with 40 wt.-% of an iron oxide pigment B.

Examples of oxidation retarders and heat stabilizers are halides of the metals from group I of the periodic table, examples being sodium, potassium and/or lithium halides, optionally in combination with copper(I) halides, e.g., chlorides, bromides, iodides, sterically hindered phenols, hydroquinones, different substituted representatives of these groups, and mixtures thereof, in concentrations of up to 1 wt.-%, based on the weight of the polymer blend according to the present invention.

(VII)

In this formula, n is of from 2 to 25. In another aspect of the invention n is of from 2 to 20. In a further aspect n is of from 2 to 15.

This sterically hindered amine (CAS Number 192268-64-7) and its preparation are known to the skilled worker and described in the literature (see, for example, EP-A 782 994 and the literature references cited therein). It is sold by BASF under the Chimassorb® 2020 name.

Furthermore fibrous and pulverulent fillers and reinforcing agents are used. Examples of the latter are carbon fibers, glass fibers, amorphous silica, calcium silicate (wollastonite), aluminum silicate, magnesium carbonate, kaolin, chalk, powdered quartz, mica, and feldspar.

Examples of nucleating agents that can be used are talc, calcium chloride, sodium phenylphosphinate, aluminum oxide, and silicon dioxide.

Examples of lubricants and mold release agents, which can be used in general in amounts up to 1 wt.-%, are long-chain fatty acids such as stearic acid or behenic acid, their salts (e.g., Ca or Zn stearate) or esters (e.g., stearyl stearate or pentaerythrityl tetrastearate), and also amide derivatives (e.g., ethylenebisstearylamide). For better processing, mineral-based antiblocking agents may be added in amounts up to 0.1 wt.-% to the molding compositions of the invention. Examples include amorphous or crystalline silica, calcium carbonate, or aluminum silicate.

Processing aids which can be used are, for example, mineral oil such as white oil.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

For further improving the resistance to inflammation, it is possible to add all of the flame retardants known for the thermoplastics in question, more particularly those flame retardants based on phosphorus compounds and/or on red phosphorus itself.

In one aspect of the present invention the thermoplastic resin composition comprises at least one component E which is a metal scavenger. Metal scavengers are characterized in that they comprise reactive ligands which are capable of complexing metal ions. The reactive ligands may be attached to a small molecule or to a polymeric, often inert backbone. In one aspect of the present invention, the metal scavenger component E comprises at least one hydrazide group. In a further aspect of the present invention, the metal scavenger component E is a component according to formula (VIII):

(VIII)

wherein R15 and R16 are independently from each other selected from a linear or branched $C_2$- to $C_{10}$-alkanediyl-group, R5 to R14 are independently from each other selected from the group consisting of hydrogen, a linear or branched $C_1$ to $C_{10}$-alkyl group, an amine group, an either monosubstituted or disubstituted, linear or branched $C_1$ to $C_{10}$-monoamine or diamine, a hydroxyl group, an alkoxy group with a linear or branched $C_1$ to $C_{10}$-alkyl group, a carboxylic group, an ester group with a linear or branched $C_1$ to $C_{10}$-alkyl group, a thiol, a mercaptane with a linear or branched $C_r$ to $O_{10}$-alkyl group. In one aspect of the present invention, R5 to R14 are independently from each other selected from the group consisting of hydrogen, a linear or branched $C_1$ to $C_{10}$-alkyl group, and a hydroxyl group. In a further aspect of the present invention, R5 to R14 are independently from each other selected from the group consisting of linear or branched $C_2$- to $C_8$-alkyl group. In even another aspect of the present invention, R5 to R14 are independently from each other selected from the group consisting of linear or branched $C_2$- to $C_5$-alkyl group. In a further aspect R5, R9, R10, and R14 are independently from each other hydrogen or methyl, R6, R8, R11, R13 are independently from each other $C_2$- to $C_8$-alkyl, and R7, and R12 are independently from each other hydroxy or $C_1$ to $C_{10}$-alkoxy groups. In a further aspect R5, R9, R10, and R14 are hydrogen, R6, R8, R11, R13 are tert.-butyl, and R7, and R12 are hydroxy groups.

In another aspect, the metal scavenger E is the compound according to formula IX:

(IX)

The thermoplastic resin composition according to the present invention show improved resistance under artificial weathering conditions. This can for example be quantified by applying standardized artificial weathering tests as disclosed in DIN ISO-4892-2 or DIN ISO 4892-3 by comparing the color shift dE of inventive samples and of comparative samples. This is for example done after 6000 h of artificial weathering. In one aspect of the present invention the composition shows a color shift dE of equal to or lower than 3.0 upon UV irradiation according to ISO-4892-2 after 6000 hours. In a further aspect of the present invention the composition shows a color shift dE of equal to or lower than 2.5 upon UV irradiation according to ISO-4892-2 after 6000 hours.

In another aspect of the present invention the composition shows a color shift dE of equal to or lower than 2.0 upon UV irradiation according to ISO-4892-2 after 6000 hours.

According to one aspect of the invention, the composition shows a color shift dE of equal to or lower than 4.0 upon UV irradiation according to ISO-4892-3 after 6000 hours. In another aspect the composition shows a color shift dE of equal to or lower than 3.0 upon UV irradiation according to ISO-4892-3 after 6000 hours. In a further aspect the composition shows a color shift dE of equal to or lower than 1.5 upon UV irradiation according to ISO-4892-3 after 6000 hours. The color shift dE was calculated as disclosed in DIN ISO-5033-2 with a Datacolor spectral photometer 110.

The present invention further relates to a method for the preparation of the thermoplastic resin composition according to the invention.

The thermoplastic resin composition according to the invention can generally be obtained by any usual method, comprising the step of mixing components A1, A2, B, C1, and optionally A3, C2, D, and E, at temperatures of from 100° C. to 300° C. and a pressure of from 1 to 150 bar, e.g. in random order, followed by a kneading or extrusion step.

Mixing apparatuses used are those known to the skilled person. Components A1, A2, B, C1, and optionally A3, C2, D, and E may be mixed, for example, by joint extrusion, kneading, or rolling.

Examples of mixing apparatus for implementing the method includes discontinuously operating, heated internal kneading devices with or without ram-feeder, continuously operating kneaders, such as continuous internal kneaders, screw kneaders with axially oscillating screws, Banbury kneaders, furthermore extruders, and also roll mills, mixing roll mills with heated rollers, and calenders.

In one aspect of the invention, the mixing apparatus used is an extruder. Particularly suitable for melt extrusion are, for example, single-screw or twin-screw extruders. In a further aspect of the invention a twin-screw extruder is used.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of components A1, A2, B, C1, and optionally A3, C2, D, and E, and should be selected such as to result in a substantially liquid-melt polymer mixture. On the other hand, the temperature is not to be unnecessarily high, in order to prevent thermal damage of the polymer mixture.

The mechanical energy introduced may, however, also be high enough that the mixing apparatus may even require cooling. Mixing apparatus is operated customarily at of from 160 to 400° C., in another aspect of from 180 to 300° C.

In one aspect of the invention, mixing can be performed for example by joint extrusion and calendering. The calendering is expediently carried out firstly in kneaders or extruders (softening) and, if desired, on mixing rolls, followed by the actual calendering process with, if desired, addition of suitable stabilizers. Blowmolding and injection molding are carried out on the usual machinery.

In one aspect of the invention, the extrusion of the thermoplastic resin composition according to the present invention is carried out in an extruder at a temperature above 100° C. In another aspect of the present invention the feeding zone of the single- or twin-screw extruder is set to a temperature in the range of from 100 to 180° C., the mixing/kneading zones to of from 180 to 250° C. and the final zones to of from 220 to 270° C. Nozzle temperature is set to a temperature in the range of from 240 to 280° C. In a further aspect, the nozzle temperature is set to a temperature in the range of from 255 to 265° C. Tool temperature is set to a temperature in the range of from 50 to 100° C. In one aspect of the invention, tool temperature is set in the range of from 60 to 80° C. Screw speed is set in the range of from 300 to 500 rpm. Injection pressure is set in the range of from 50 to 120 bar. In another aspect of the invention, injection pressure was set in the range of from 80 to 110 bar.

For workup the extruder can be equipped with a hole-plate, water-bath and pelletizer for making pellets or micropellets.

Another aspect of the present invention is related to the method for preparation the thermoplastic resin composition according to the present invention wherein at least two of components A1, A2, B, C1, and optionally A3, C2, D, and E are premixed to form a masterbatch.

Another aspect of the invention relates to the use of the thermoplastic resin composition for the preparation of molded articles, such as articles used for cars or electronic devices.

A further aspect of the invention relates to molded articles prepared from the thermoplastic resin composition according the present invention. The molded article can be used in various fields of applications such as household items, electronic components, household equipment, garden equipment, medical-technology equipment, automotive parts, motor-vehicle components, building and construction, and bodywork parts. In another aspect the polymer blend as described above can be used for the production by injection molding of a automotive part, a household part, wall sidings, or roof tiles.

EXAMPLES

The following examples and claims further illustrate the invention.

Raw Materials

Luran® S 776 SE is a commercially available ASA copolymer from INEOS Styrolution.

Palatinol® 10-P (phthalic acid ester of 010 alcohols) can be purchased from BASF SE.

Colortherm® Red 110M is a micronized iron oxid red pigment, commercially available by Supplier Lanxess (Germany), produced according to Laux process.

Sicotrans® Red K 291 is an iron oxide red pigment produced via precipitation process available by BASF SE, Germany.

Tinuvin® P (2-(2H-benzotriazol-2-yl)-p-cresol, CAS-No. 2440-22-4) is a commercial UV-absorber that can be purchased from BASF SE.

Tinuvin® 770 (Bis(2,2,6,6-tetramethyl-4-piperidyl) sebacate, CAS-No. 52829-07-9) can be purchased from BASF SE.

Irganox® MD 1024 (3-(3,5-ditert-butyl-4-hydroxyphenyl)-N'43-(3,5-ditert-butyl-4-hydroxy-phenyl)-propanoylF-propanehydrazide, CAS-No. 251-156-3) is a metal scavenger that can be purchased from BASF SE (Germany).

Characterization of Iron Oxide Pigments

Iron oxide pigment samples of Colortherm® Red 110M and Sicotrans® Red K 291 have been analyzed by energy-dispersive X-ray spectroscopy (EDX) and Wavelength-dispersive X-ray spectroscopy (WDX) using a Zeiss Ultraplus scanning electron microscope. Primary energy used 20 kV. Samples were pressed to pellets using a KBr press. Additionally particle sizes of the iron oxide pigments have been analyzed using a Zeiss Leo 1530.

Figure 3:
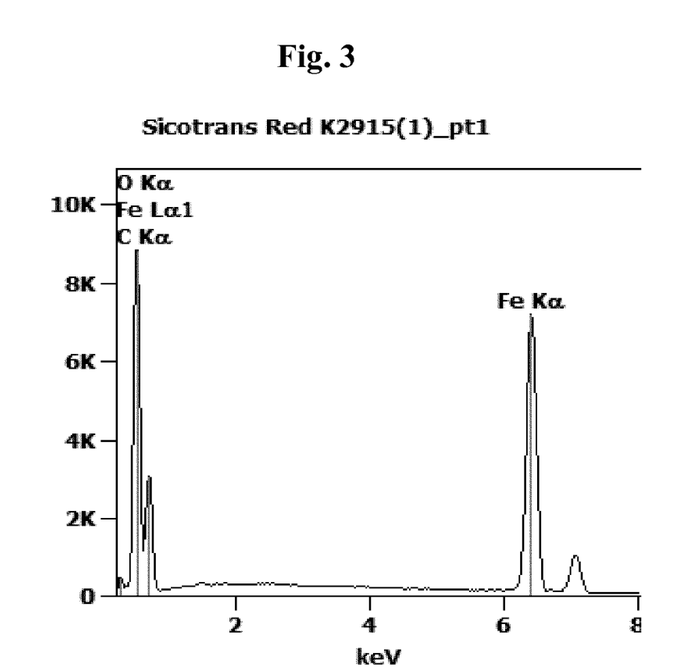
FIG. 3 shows an energy-dispersive X-ray spectroscopy spectrum of an iron oxide red pigment sample Sicotrans® Red K 291.

EDX analysis of Sicotrans® Red K 291 resulted in EDX spectra as disclosed exemplary in FIG. 3. The elements iron and oxygen were identified. The following atomic ratios of oxygen and iron were measured:

| Position c | Oxygen (K-line) | Iron (K-Line) |
|---|---|---|
| Sicotrans Red K2915(1)_pt1 | 61.0 | 39.0 |
| Sicotrans Red K2915(1)_pt2 | 60.9 | 39.1 |
| Sicotrans Red K2915(1)_pt3 | 59.8 | 40.2 |
| Sicotrans Red K2915(1)_pt4 | 59.2 | 40.8 |
| Sicotrans Red K2915(2)_pt1 | n.d. | |
| Sicotrans Red K2915(2)_pt2 | 59.4 | 40.6 |

-continued

| Position c | Oxygen (K-line) | Iron (K-Line) |
|---|---|---|
| Sicotrans Red K2915(2)_pt3 | 59.0 | 41.0 |
| Sicotrans Red K2915(2)_pt4 | 58.8 | 41.2 |
| Average | 59.7 | 40.3 |

Figure 2:
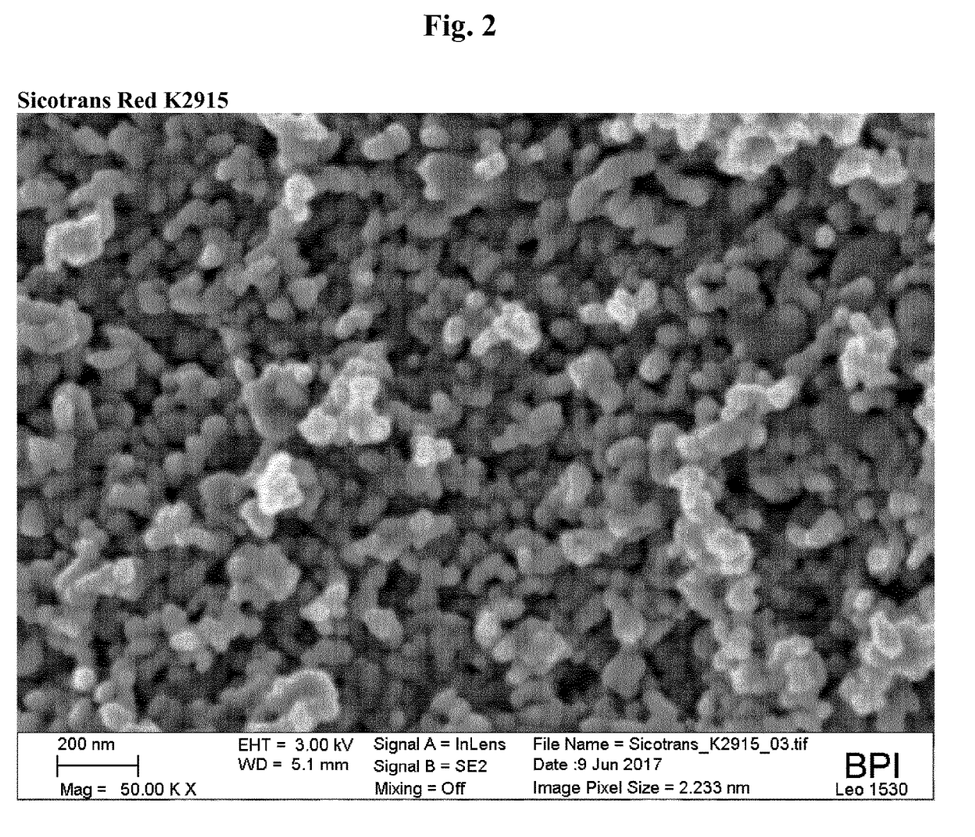
FIG. 2 discloses a scanning electron microscope image of an iron oxide red pigment sample Sicotrans® Red K 291.
Figure 4:
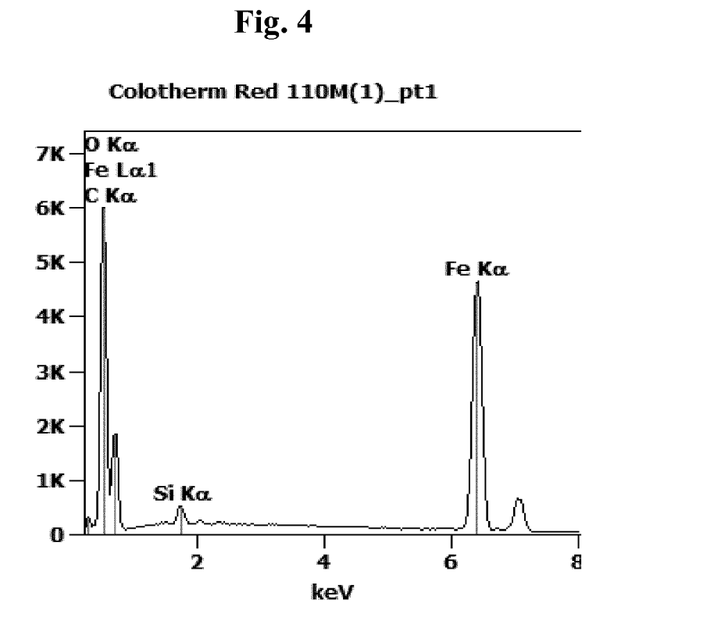
FIG. 4 discloses an energy-dispersive X-ray spectroscopy spectrum of an iron oxide red pigment sample Colortherm® Red 110M.

No other elements could be identified in the Sicotrans® Red K 291 samples using WDX measurements. Particle sizes of Sicotrans® Red K 291 were measured (FIG. 2) resulting in an average particle size of 48 nm+1-8 nm based on the evaluation of 17 particles. EDX analysis of Colortherm® Red 110M resulted in EDX spectra as disclosed exemplary in FIG. 4. The elements iron, silica and oxygen were identified. The following atomic ratios of oxygen, silica, and iron were measured:

| Position | Oxygen (K-Line) | Silica (K-Line) | Iron (K-Line) |
|---|---|---|---|
| Colotherm Red 110M(1)_pt1 | 61 | 1.4 | 37.6 |
| Colotherm Red 110M(1)_pt2 | 61 | 1.5 | 37.5 |
| Colotherm Red 110M(1)_pt3 | 59.1 | 1.5 | 39.4 |
| Colotherm Red 110M(1)_pt4 | 56.9 | 1.3 | 41.8 |
| Colotherm Red 110M(1)_pt5 | 55.9 | 1.5 | 42.6 |
| Colotherm Red 110M(2)_pt1 | 60.2 | 1.3 | 38.5 |
| Colotherm Red 110M(2)_pt2 | 55.7 | 2.7 | 41.6 |
| Colotherm Red 110M(2)_pt3 | 55.7 | 3.1 | 41.2 |
| Colotherm Red 110M(2)_pt4 | 62.8 | 1.4 | 35.8 |
| Colotherm Red 110M(2)_pt5 | 58.6 | 1.4 | 40 |
| Colotherm Red 110M 2(1)_pt1 | 60.3 | 1.4 | 38.3 |
| Colotherm Red 110M 2(1)_pt2 | 59.1 | 1.7 | 39.2 |
| Colotherm Red 110M 2(1)_pt3 | 61.2 | 5.3 | 33.5 |

Figure 1:
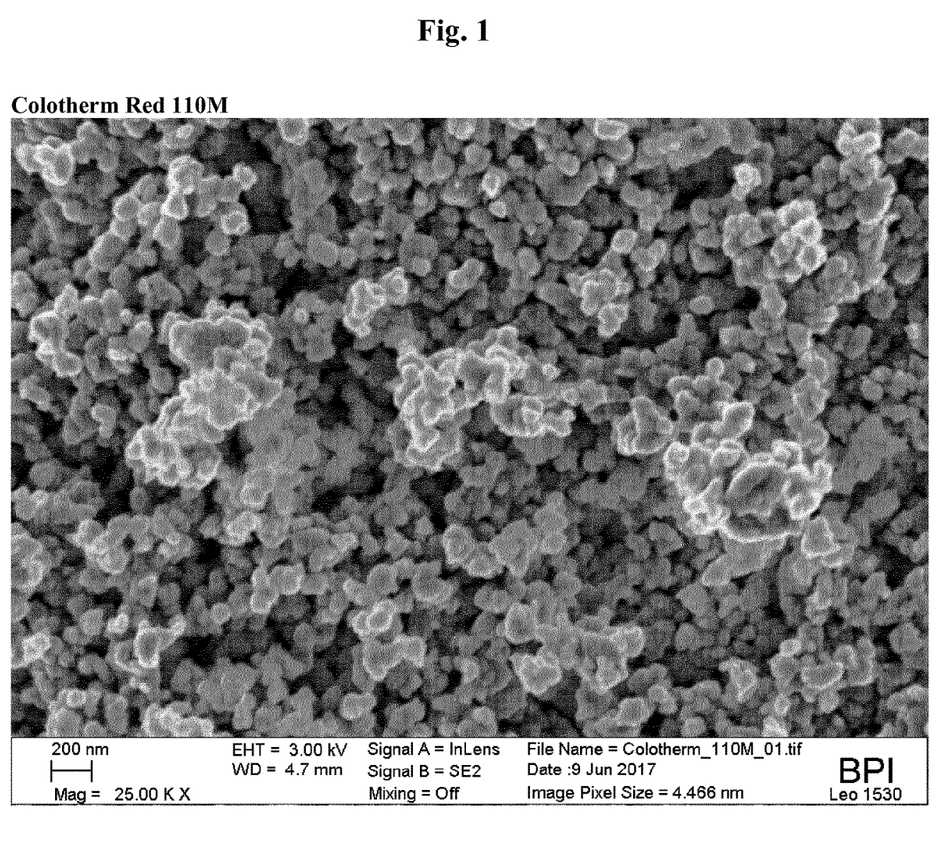
FIG. 1 shows a scanning electron microscope image of an iron oxide red pigment sample Colortherm® Red 110M.

No other elements could be identified in the Colortherm® Red 110M samples using WDX measurements. Particle sizes of Colortherm® Red 110M were measured (FIG. 1) resulting in an average particle size of 82 nm+1-7 nm based on the evaluation of 23 particles.

Sample Preparation

For compounding a Coperion ZSK 25 extruder was used and for injection molding an Arburg machine. All test specimens have the following dimensions: 75×50 mm.

Testing

Artificial weathering according to ISO 4892-2A(1) was conducted under the following conditions:

| Irradiance | wavelength | nm | 300 to 400 | 340 |
|---|---|---|---|---|
| | Light strength | W/m² | 60 ± 2 | 0.51 ± 0.02 |
| Black board temperature | | ° C. | 65 ± 3 | |
| Relative humidity | | % | 50 ± 10 | |
| Cycle time for water spray | Duration for water spray | min | 18 | |
| | Duration for not water spray | min | 102 | |
| Xenon filter combination | Inner | — | Boro. S. (S-type) | |
| | Outer | — | Boro. S. (S-type) | |

For artificial weathering according to ISO 4892-3 a Q-UVse tester equipped with UVA-340 lamps was used. Each cycle consists of 8 h irradiation (0.76 W/m², 60° C. black panel temperature) and 4 h condensation (no irradiation, 50° C. black panel temperature).

For color measurements a commercial testing device Datacolor 110 was used.

Example 1 comprising Sicotrans® Red K 2915 shows significantly higher UV resistance compared to comparative example 1 comprising natural Colortherm® Red 110M.

Samples have been tested according to two different artificial weathering methods: ISO 4892-2 and ISO 4892-3. Total color shift has been measured every 1000 h.

| | Example 1 | Comparative Example 1 |
|---|---|---|
| Component A (thermoplastic resin) Luran ® S 776SE | 95.69 | 95.69 |
| Component D (additive) Palatinol ® 10-P | 1.44 | 1.44 |
| Component B (Pigment) Sicotrans ® Red K 2915 | 1.91 | |
| Component B (Pigment) Colortherm Red 110M | | 1.91 |
| Component C1 (HALS) Tinuvin ® 770 | 0.48 | 0.48 |
| Component C2 (UV absorber) Tinuvin ® P | 0.48 | 0.48 |
| dE after 4000 h (ISO 4892-2) | 0.43 | 3.12 |
| dE after 5000 h (ISO 4892-2) | 0.66 | — |
| dE after 6000 h (ISO 4892-2) | 1.73 | 3.04 |
| dE after 5000 h (ISO 4892-3) | 1.1 | 3.4 |
| dE after 6000 h (ISO 4892-3) | 0.8 | 4.3 |

The invention claimed is:

1. Thermoplastic styrene copolymer resin composition comprising:
   (a1) at least one styrene-acrylonitrile copolymer component A1,
   (a2) at least one acrylonitrile styrene acrylate graft copolymer A2 as impact modifier,
   (a3) optionally at least one thermoplastic polymer A3 other than components A1 and A2,
   (b) at least one transition metal oxide pigment B,
   (c1) at least one hindered amine UV light stabilizer C1,
   (c2) optionally at least one UV absorber C2 different from C1,
   (d) optionally further polymer additives D, other than components B, C1, C2, and E, and
   (e) optionally one metal scavenger component E, wherein at least 99.0 wt.-% of the transition metal oxide pigment B consist of transition metal atoms and oxygen atoms.

2. The thermoplastic styrene copolymer resin composition according to claim 1, comprising 70.0 to 99.4 wt.-%, based on the total weight of the composition, of components A1, A2, and optionally A3, and comprising 0.5 to 7.0 wt.-%, based on the total weight of the composition, of component B, and comprising 0.1 to 3.0 wt.-% based on the total weight of the composition, of components C1 and optionally C2.

3. The thermoplastic styrene copolymer resin composition according to claim 1, comprising
   (i) of from 87.5 to 99.3 wt.-%, based on the total weight of the composition, of A1, A2, and optionally A3,
   (ii) of from 0.4 to 7.0 wt.-%, based on the total weight of the composition, of component B,
   (iii) of from 0.1 to 1.5 wt.-%, based on the total weight of the composition, of at least one hindered amine UV light stabilizer C1 and optionally of from 0.1 to 1.5 wt.-% of at least one UV absorber C2 other than C1,
   (iv) of from 0.1 to 2.5 wt.-%, based on the total weight of the composition, of at least one further polymer additive D, and
   (v) of from 0.1 to 1.5 wt.-% based on the total composition of at least one metal scavenger component E.

4. The thermoplastic styrene copolymer resin composition according to claim 1, wherein the styrene-acrylonitrile copolymer component A1 has an acrylonitrile content of from 5 to 35 wt.-% based on the total weight of the styrene-acrylonitrile copolymer component A1.

5. The thermoplastic styrene copolymer resin composition according to claim 1, wherein the impact-modified graft rubber acrylonitrile styrene acrylate A2 comprises:
  a graft base of from 40 to 90 wt.-% based on the total weight of the impact-modified graft rubber acrylonitrile styrene acrylate A2 comprising:
   (i) from 70 to 99.9 wt.-% of n-butyl acrylate based on the total weight of the graft base,
   (ii) from 0 to about 30 wt.-% of styrene based on the total weight of the graft base, and
   (iii) from 0.1 to 5 wt.-% of a crosslinking agent based on the total weight of the graft base; and
  a graft of from 10 to 60 wt.-% comprising:
   (iv) from 65 to 95 wt.-% of styrene based on the total weight of the graft, and
   (v) from 5 to 35 wt.-% of acrylonitrile based on the total weight of the graft.

6. The thermoplastic styrene copolymer resin composition according to claim 1, which comprises from 1 to 70 wt.-% based on the total weight of components A1 and A2 of at least one thermoplastic polymer A3 selected from the group consisting of polycarbonate (PC), polyamide (PA), and mixtures thereof.

7. The thermoplastic styrene copolymer resin composition according to claim 1, wherein the transition metal oxide pigment component B is iron oxide.

8. The thermoplastic styrene copolymer resin composition according to claim 1, wherein component C1 is a hindered amine UV light stabilizer according to the following formula (Ia) and/or formula (Ib):

(Ia)

(Ib)

wherein R1 is H or methyl; each R2 is individually selected from the group consisting of hydrogen, methyl, and ethyl; R3 is selected from the group consisting of linear $C_1$- to $C_{18}$-esters which are connected to formula (Ia) via the oxygen atom of the ester function; and with R4 being selected from the group consisting of $C_1$- to $C_{10}$-alkylene.

9. The thermoplastic styrene copolymer resin composition according to claim 1, wherein at least one component E is present, which is a metal scavenger comprising at least one hydrazide group.

10. The thermoplastic styrene copolymer resin composition according to claim 1, wherein the composition comprises only one hindered amine UV light stabilizer C1 and no UV absorber C2.

11. The thermoplastic styrene copolymer resin composition according to claim 1, wherein the composition shows a color shift dE of equal to or lower than 3.0 upon UV irradiation according to ISO-4892-2 after 6000 hours.

12. A method for preparing the thermoplastic styrene copolymer resin composition according to claim 1, comprising the step of mixing components A1, A2, B, C1, and optionally C2, A3, D, and E at temperatures of from 100° C. to 300° C. and a pressure of from 1 to 50 bar, in any order, followed by a kneading or extrusion step.

13. The method for preparing the thermoplastic resin composition according to claim 12, wherein at least two of components A1, A2, B, C1, and optionally A3, C2, D, and E are premixed to form a masterbatch.

14. A molded article prepared from the thermoplastic styrene copolymer resin composition according to claim 1.

* * * * *